United States Patent
Hengstenberg et al.

(10) Patent No.: US 6,406,211 B1
(45) Date of Patent: Jun. 18, 2002

(54) CONNECTING DEVICE FOR A BEARING ARM

(75) Inventors: Rolf Hengstenberg, Attendorn; Ute Tilsch, Plettenberg; Holger Schadwinkel, Laupheim, all of (DE)

(73) Assignee: Plettac AG, Plettenberg (DE)

( * ) Notice: Subject to any disclaimer, the term of this patent is extended or adjusted under 35 U.S.C. 154(b) by 0 days.

(21) Appl. No.: 09/555,397

(22) PCT Filed: Nov. 16, 1998

(86) PCT No.: PCT/EP98/07301

§ 371 (c)(1),
(2), (4) Date: May 26, 2000

(87) PCT Pub. No.: WO99/28573

PCT Pub. Date: Jun. 10, 1999

(30) Foreign Application Priority Data

Dec. 1, 1997 (DE) .......................................... 197 53 295

(51) Int. Cl.[7] .................................................. B66B 7/02
(52) U.S. Cl. ......................................... 403/49; 403/256
(58) Field of Search ........................... 403/49, 246, 256, 403/230, 174, 175; 182/179.1, 119, 222

(56) References Cited

U.S. PATENT DOCUMENTS

| 4,180,342 A | * | 12/1979 | Layher | 403/49 X |
| 4,394,095 A | * | 7/1983 | Layher | 403/49 |
| 4,867,274 A | * | 9/1989 | Langer | 403/49 X |
| 4,958,702 A | * | 9/1990 | Langer | 403/49 X |
| 5,127,757 A | * | 7/1992 | Langer | 403/49 |
| 5,868,223 A | * | 2/1999 | Lubinski | 182/179.1 |
| 6,045,287 A | * | 4/2000 | Busch | 403/49 |

FOREIGN PATENT DOCUMENTS

| DE | 3934 857 A1 | 4/1991 |
| DE | 691 00 219 T2 | 5/1994 |
| DE | 196 25 545 A | 1/1998 |
| EP | 0 276 487 A | 8/1988 |
| EP | 0 351 703 A | 1/1990 |
| EP | 0 423 516 A | 4/1991 |
| EP | 0 451 068 A | 10/1991 |
| FR | 2 723 153 A | 2/1996 |

* cited by examiner

Primary Examiner—Lynne H. Browne
Assistant Examiner—John R. Cottingham
(74) Attorney, Agent, or Firm—Oppedahl & Larson LLP

(57) ABSTRACT

A connecting device has an attachment head and a clamping device for connecting horizontal or diagonal scaffolding elements to perforated disks of vertical post elements. The attachment head has a bearing surface on one side by which it is supported on the pipe of the post element. On the same side a horizontal slit is present, corresponding at least to the thickness of the perforated disks. The slit divides the bearing surface into two sub-surfaces. A feature is provided on the side opposite the bearing surface for welding on a pipe. The overall height of the attachment head on the side by which feature the attachment head is supported on the pipe is at least 68 millimeters. The top surface and the bottom surface of the attachment head taper continuously from the bearing surface to the feature for welding on the pipe.

11 Claims, 4 Drawing Sheets

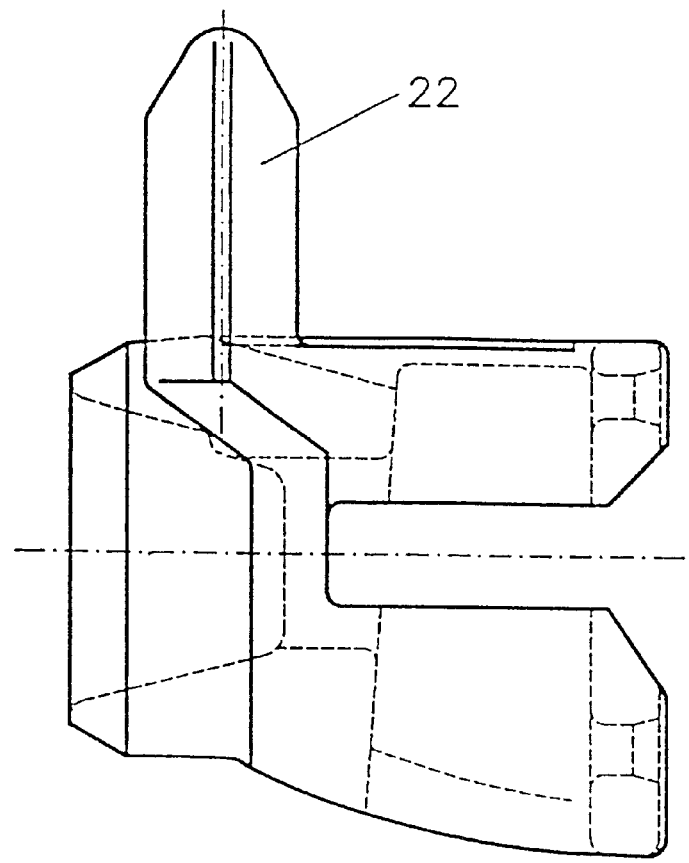
Fig. 3
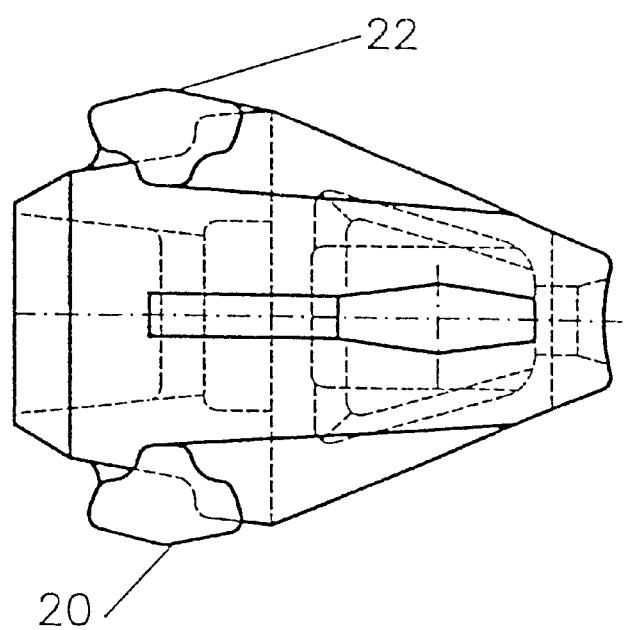

CONNECTING DEVICE FOR A BEARING ARM

The present invention relates to a connecting device, consisting of an attachment head and a clamping device for connecting horizontal or diagonal scaffolding elements to the perforated discs of the vertical post elements, said attachment head having a bearing surface on one side by which means it is supported on the pipe of the post element, and a horizontal slit corresponding at least to the thickness of the perforated disc is present on the same side, said slit dividing the bearing surface into two sub-surfaces, and on which means for welding on a scaffolding pipe are provided on the side opposite the bearing surface.

Connecting devices of this type are known for example from DE-PS-24 49 124. Said reference describes a connection device for horizontal and/or diagonal scaffolding elements with vertical post elements. Said vertical post elements have regularly spaced holding means for suspending the horizontal and/or diagonal scaffolding elements, said holding means being provided with elongated holes in two directions being perpendicular to each other. The horizontal and/or diagonal scaffolding elements carry connecting devices on their ends, each consisting of an attachment head and a wedge. The attachment head has a slit corresponding at least to the thickness of the holding means, which in its built-in state extends perpendicular relative to the central axis of the vertical post element and which in its mounted state embraces said holding means.

The attachment heads of the horizontal and/or vertical scaffolding elements can be clamped tightly to the holding means by a wedge. By this design of the holes an exact alignment of the horizontal or diagonal scaffolding element can be achieved in straight-line as well as in right-angled direction without the use of special measuring methods.

This connecting device has proved itself to be valuable throughout many years. Said connecting device has the disadvantage that the bending moment that can be taken up by this connecting device is limited, so that the scaffolding may twist under high loads. Said disadvantage could be eliminated, by enlarging the attachment head that is situated on both ends of the horizontal or diagonal scaffolding elements, but which would also raise the weight of the bearing bar, making the handling of said bearing bar more difficult.

The object of the present invention is therefore, to provide a connecting device that can take up a higher bending moment than connecting devices according to the prior art without noticeably raising the weight of said connecting devices.

According to the present invention said object is achieved by providing a connecting device, consisting of an attachment head and a clamping device for connecting the horizontal or diagonal scaffolding elements to the perforated discs of the vertical post elements, whereby the attachment head has a bearing surface on one side by which means said attachment head is supported on the pipe of the post element, a horizontal slit corresponding at least to the thickness of the perforated disc is present on the same side, dividing the bearing surface into two sub-surfaces, on the attachment head means for welding on a scaffolding pipe are provided on the side opposite the bearing surface, the overall height of the attachment head on the side by which means said attachment head is supported on the pipe of the post element is at least 68 mm and the top and bottom surface of the attachment head taper continuously from the bearing surface to the means for welding on a scaffolding pipe.

Preferably the top surface of the attachment head tapers along a curve that is made up of several convex and/or concave segments of a circle with different radius, whereas the bottom surface of the attachment head tapers along a convex segment of a circle with a constant radius.

Preferably the overall height of the attachment head on the side by which means said attachment head is supported on the pipe of the post element is 70 to 80 mm. In another preferred embodiment the ratio of the height of the upper sub-surface of the bearing surface to the height of the lower sub-surface of the bearing surface is 1:1.3 to 1:1.6.

The lateral boundary surfaces of the attachment head according to the present invention are preferably designed in such a way that they extend towards a center in a wedge-like manner. Particularly preferred said lateral boundary surfaces each form an angle of 22.5°, preferably 22° or less, relative to the central axis.

On the side opposite the bearing surface the means for welding on the scaffolding pipe is situated, which preferably has a welding area suitable for welding as well as centering aids for the scaffolding pipes. Said welding area can be designed for round, rectangular or quadratic scaffolding pipes. By means of the centering aids the scaffolding pipe and the attachment head are centered relative to one another. Particularly for welding on round scaffolding pipes, 4 centering aids, displaced by 90°, relative to one another, are mounted on the attachment head, such that the difference between the outer surface of two centering aids, facing one another, is equal to or a little bit smaller than the inner diameter of the scaffolding pipe, which is directed via the centering aid prior to welding. For rectangular scaffolding pipes said centering aid is U-shaped.

If the attachment head is welded to a round scaffolding pipe, said welding area preferably has a ring-shaped connection surface, on which the round scaffolding tube is supported. The outer diameter of the ring-shaped connection surface is smaller than the outer diameter of the scaffolding tube. A cone-shaped surface having an outer diameter that is equal to or insignificantly bigger than the outer diameter of the scaffolding pipe is connected to the ring-shaped connection surface. A cyclindrical surface having a diameter that is equal to or insignificantly bigger than the outer diameter of the scaffolding pipe is connected to the cone-shaped surface. By this design of the welding area exactly defined welding conditions in the shape of half a Y-seam can be achieved, so that the welding connection can be made using a welding apparatus.

In another preferred embodiment the clamping device of the connecting device is a wedge. Said wedge is put through one of the holes of the holding means of the vertical post elements and is then secured, for example, with a hammer, so that a form-closed and non-positive connection between the horizontal or diagonal scaffolding elements and the vertical post elements results.

In another preferred embodiment, the attachment head additionally has preferably round or star-shaped bolts for non-positive connection with the overlying elements that are situated on the bearing bar. Preferably these bolts are situated on the left and right exterior surface of the attachment head. Said bolts are each flattened and integrated into the attachment head in such a way that the respective exterior surface of the bolts does not protrude the respective exterior surface of the attachment head. The bolts are preferably integrated into the mold for the production of the connecting device.

Another object of the present invention is a bearing bar consisting of a pipe and a connecting device according to the present invention on each of its two ends.

Another object of the present invention is the use of the connecting device according to the present invention and the use of the bearing bar according to the present invention as part of scaffolding system.

With reference to the FIGS. 1 to 4 the advantages of the invention will be discussed below. These explanations are made by way of example only and do not limit the scope of the invention.

In the drawings:

FIG. 3 shows the connecting device according to the present invention with integrated bolts in two different views.

Figure 1:
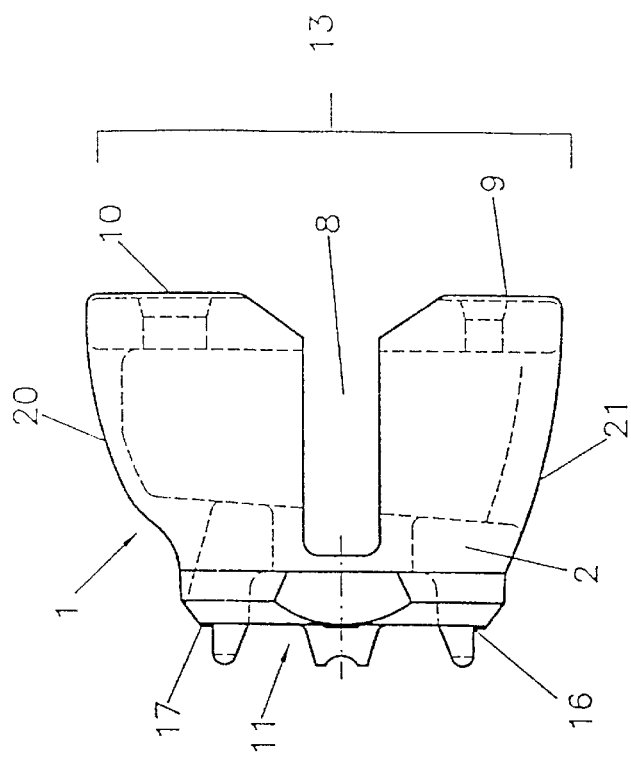
FIG. 1 shows a connecting device according to the present invention in three different views, whereby the welding area is designed for round scaffolding pipes.
Figure 1:
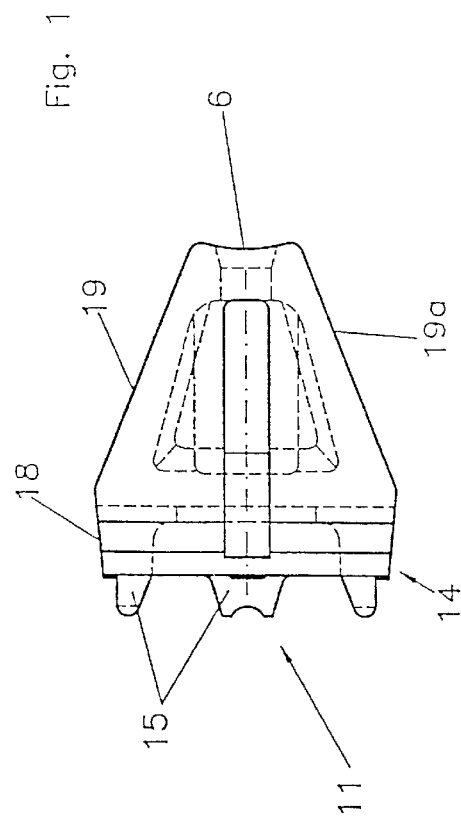
Figure 1:
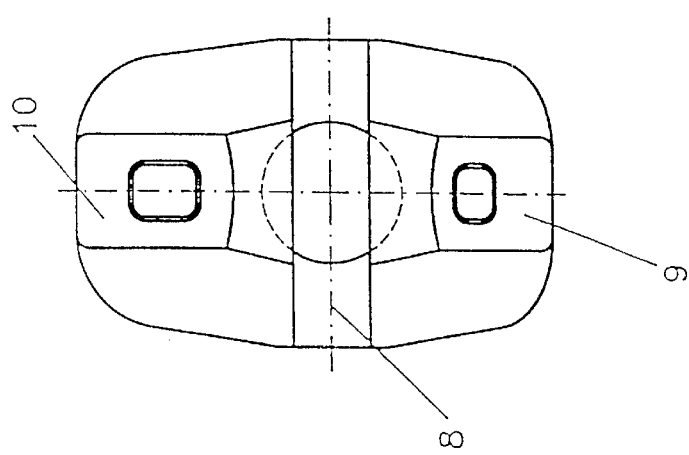

FIG. 1 shows a connecting device 1 according to the present invention. The connecting device consists of an attachment head 2 and a wedge (not shown). The attachment head has on one side the bearing surface 6 by which means the attachment head is supported on the pipe of the vertical post element (not shown). Accordingly the radius by which said bearing surface 6 is bent corresponds to half of the diameter of the scaffolding pipes, i.e. 24.15 mm. The overall height 13 of the attachment head on this side is 76±1.3 mm. The bearing surface 6 is divided by the slit 8 into two sub-surfaces 9 and 10. The ratio of the height of the sub-surface 9 to the height of the sub-surface 10 is 1:1.38.

The top surface 20 and the bottom surface 21 of the attachment head taper continuously from the bearing surface 6 to the means for welding on the scaffolding pipe 11. The top surface tapers along a curve that is made up of several convex and concave segments of a circle having different radius, whereby the radius of the segment of the circle close to the bearing surface 6 is large enough for the top surface to be almost planar in this area. The bottom surface 21 of the attachment head tapers along a convex segment of a circle with a constant radius.

The lateral boundary surfaces 19 and 19a of the attachment head are designed such that they extend towards a center in a wedge-like manner. The lateral boundary surfaces each form an angle of 22°, relative to the central axis.

On the side opposite the bearing surface, the attachment head has a means 11 for welding on a round scaffolding pipe. Said means 11 is furthermore made up by 4 centering aids 15, being displaced by 90°, relative to one another on a circle. The distance of the outer surface of two centering aids facing one another is 41.2 mm, i.e. it is a little smaller than the inner diameter of the scaffolding pipe that is directed via these centering aids prior to welding.

In addition to this, the means for welding on a scaffolding pipe 11 has a welding area 14 with a ring-shaped connection surface, on which the scaffolding pipe 12 is supported after it has been directed via the centering aid 15. The outer diameter of the ring-shaped connection surface is 45.5 mm and is therefore insignificantly smaller than the outer diameter of the scaffolding pipe to be welded on. To the ring-shaped connecting surface 16 a cone-shaped surface 17 having a width of 4.1 mm is connected to which a cylindrical surface with a diameter of 51.5 mm and a width of 4.8 mm is connected.

By this design of the respective surfaces and by this choice of the respective diameters welding conditions in the form of half a Y-seam can be achieved that are exactly defined along the whole length of the welding seam. Exactly defined welding conditions are an important prerequisite for the welding seam to be made by a welding apparatus.

Figure 2:
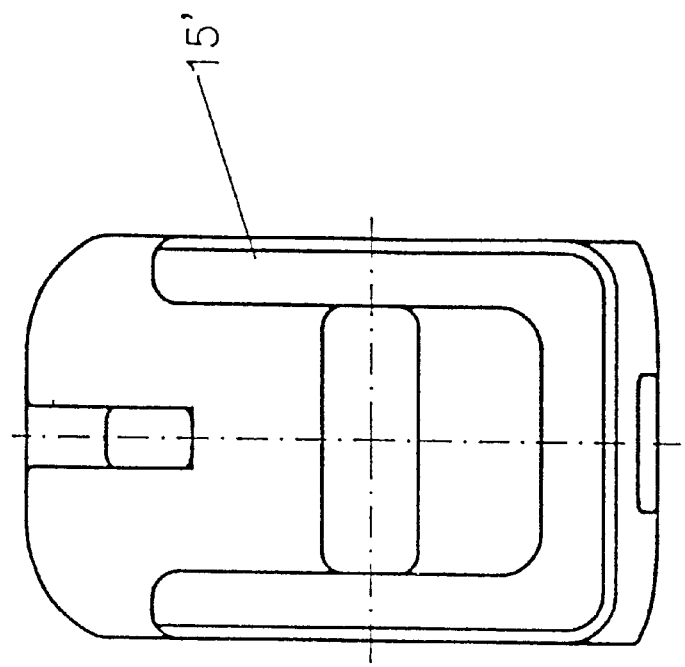
FIG. 2 shows a connecting device according to the present invention in two different views, whereby the welding area is designed for U-shaped scaffolding pipes.
Figure 2:
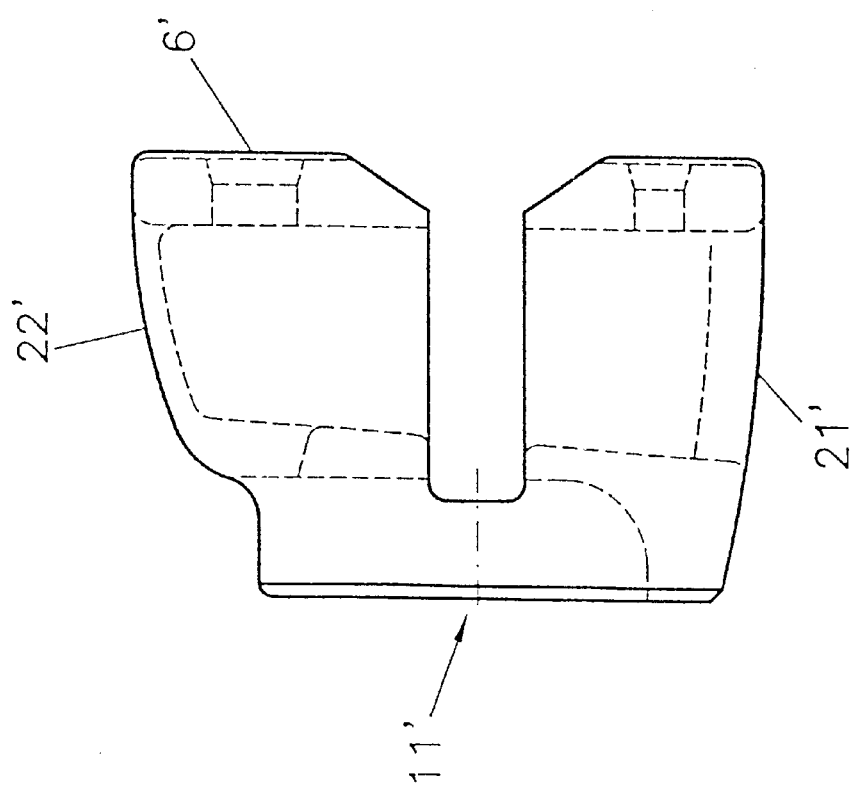

FIG. 2 also shows a connecting device according to the present invention, whereby the welding area is designed for U-shaped scaffolding pipes. In this case the centering aid 15' is U-shaped, so that a U-shaped scaffolding pipe can be directed above it, prior to being welded to the attachment head. With this scaffold head it can also be clearly seen that the top surface 20' as well as the bottom surface 21' of the scaffold head taper continuously from the bearing surface 6' to the means for welding on the rectangular scaffolding pipe 11' and along a similar curve as the attachment head according to FIG. 1.

FIG. 3 shows an attachment head with integrated bolts 22. The bolts for the non-positive connection with overlying elements, that are situated on the bearing bars, with the connection devices according to the present invention, are located on the left and right on the exterior surface of the attachment head. Said bolts have a triangular shape.

Figure 4:
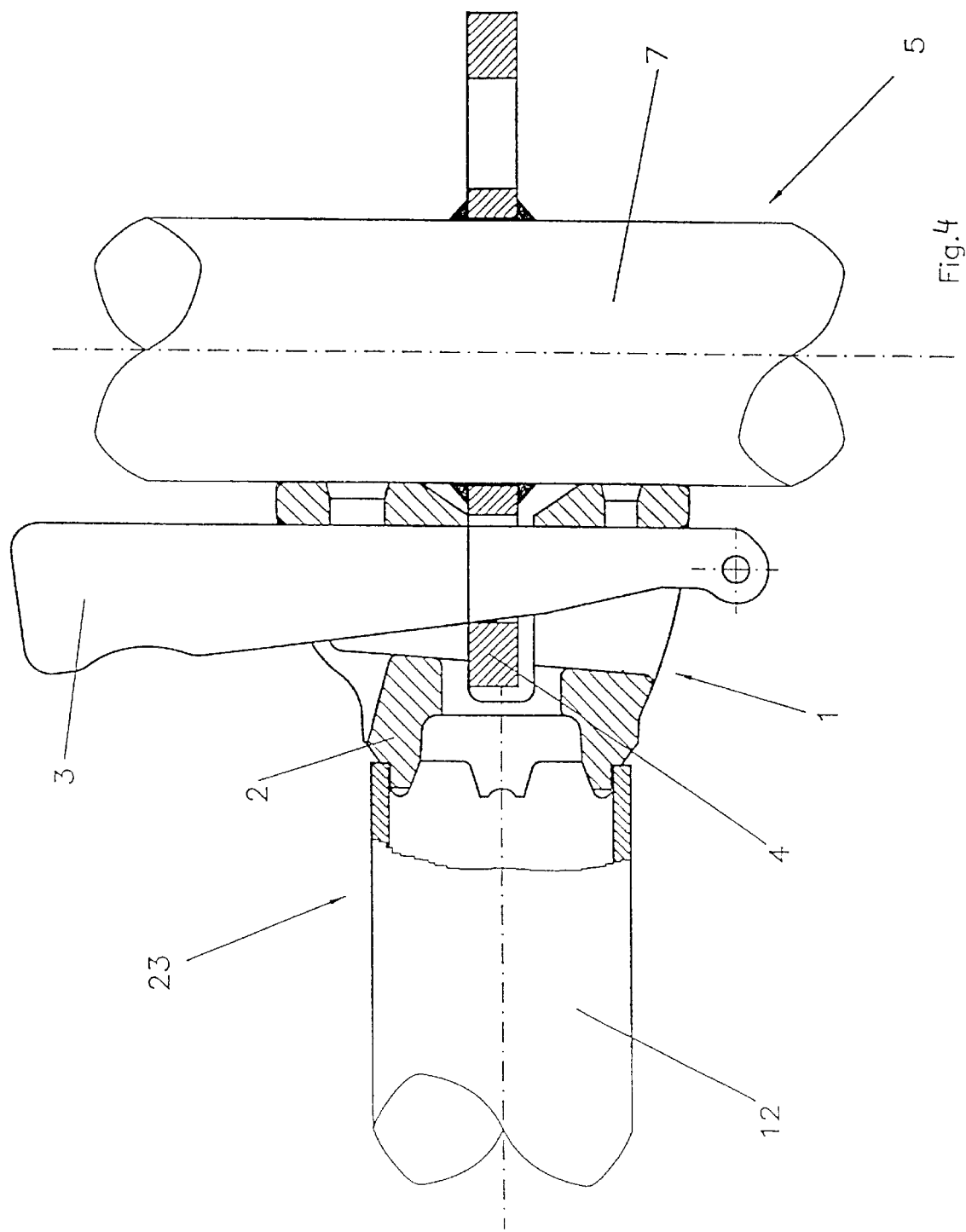
FIG. 4 shows a bearing bar according to the present invention connected to the perforated disc of the vertical post elements.

FIG. 4 shows a horizontal scaffold element 23 with a scaffold pipe 12, which on its ends has a connecting device 1 according to the present invention, which is connected to the perforated disc 4 of the vertical post element 5. The construction of the scaffolding is done in such a way that the horizontal scaffolding elements 23 having on their ends the connecting devices according to the present invention, are each pushed with the horizontal slit provided on the attachment head over those of the perforated disc of the scaffolding element such that the wedge 3 aligns with one of the holes in the perforated disc. The wedge is then put through the hole and secured with a hammer, so that the bearing surface 6 is pushed against the scaffolding pipe 7 thereby producing a form-closed and non-positive connection between the horizontal and vertical scaffolding element.

The present invention has the advantage that the connecting device according to the present invention can take up a bending moment that is up to at least 15% higher, without the weight of the attachment head being raised noticeably. The danger of injuries to the personnel constructing and disassembling the scaffoldings is diminished by the rounded shape of the top and bottom surface of the attachment head.

What is claimed is:

1. A connecting device for use with vertical post elements each having a perforated disk and having pipe, and for connecting horizontal or diagonal scaffolding elements thereto, each perforated disk having a thickness, said connecting device comprising:

an attachment head and a clamping device, said attachment head having opposed first and second sides and having a top surface and a bottom surface, said attachment head having a bearing surface on the first side by which means it is supported on said pipe, said attachment head having on the first side a horizontal slit corresponding at least to the thickness of the perforated disk, said slit dividing the bearing surface into first and second sub-surfaces, means for welding on a pipe provided on the second side;

whereby the overall height of said attachment head on the first side is at least 68 millimeters and the top surface and the bottom surface of the attachment head taper continuously from the bearing surface to the means for welding on the pipe;

characterized in that the ratio of the height of the first sub-surface to the height of the second sub-surface is 1:1.3 to 1:1.6.

2. A The connecting device of claim 1, characterized in that the overall height is 70 to 80 millimeters.

3. The connecting device of claim 1, characterized in that the attachment head has lateral boundary surfaces that extend to a center in a wedge-like manner.

4. The connecting device of claim 1, characterized in that the means for welding on the pipe comprises a welding area having a form, the form of the welding area disposed to be suitable for welding on round, quadratic or rectangular scaffolding pipes and further comprising centering aids corresponding thereto.

5. The connecting device according to claim 4, characterized in that the welding area has a ring-shaped connecting surface for round scaffolding pipe having an outer diameter, said ring-shaped connecting surface having an outer diameter, the outer diameter of the ring-shaped connecting surface being smaller than the outer diameter of the scaffolding pipe;

further characterized in that a cone-shaped surface having a front which is broadening to the front is connected to the ring-shaped connecting surface, and in that a cylindrical surface having a diameter is connected to the cone-shaped surface, the diameter of the cylindrical surface being equal to or insignificantly bigger than the outer diameter of the scaffolding pipe.

6. The connecting device according to claim 1, characterized in that said clamping device is a wedge.

7. The connecting device according to claim 1, characterized in that said attachment head has bolts for a non-positive connection with overlying elements suspendable thereover.

8. The connecting device according to claim 7, characterized in that the bolts.

9. A bearing bar comprising a scaffolding pipe having first and second ends, and having first and second connecting devices on respective first and second ends of the scaffolding pipe, each said connecting device for use with vertical post elements each having a perforated disk and having pipe, and for connecting horizontal or diagonal scaffolding elements thereto, each perforated disk having a thickness, each said connecting device comprising:

an attachment head and a clamping device, said attachment head having opposed first and second sides and having a top surface and a bottom surface, said attachment head having a bearing surface on the first side by which means it is supported on said pipe, said attachment head having on the first side a horizontal slit corresponding at least to the thickness of the perforated disk, said slit dividing the bearing surface into first and second sub-surfaces, means for welding on a pipe provided on the second side;

whereby the overall height of said attachment head on the first side is at least 68 millimeters and the top surface and the bottom surface of the attachment head taper continuously from the bearing surface to the means for welding on the pipe;

characterized in that the ratio of the height of the first sub-surface to the height of the second sub-surface is 1:1.3 to 1:1.6.

10. A scaffolding system comprising a bearing bar, the bearing bar comprising a scaffolding pipe having first and second ends, and having first and second connecting devices on respective first and second ends of the scaffolding pipe, each said connecting device for use with vertical post elements each having a perforated disk and having pipe, and for connecting horizontal or diagonal scaffolding elements thereto, each perforated disk having a thickness, each said connecting device comprising:

an attachment head and a clamping device, said attachment head having opposed first and second sides and having a top surface and a bottom surface, said attachment head having a bearing surface on the first side by which means it is supported on said pipe, said attachment head having on the first side a horizontal slit corresponding at least to the thickness of the perforated disk, said slit dividing the bearing surface into first and second sub-surfaces, means for welding on a pipe provided on the second side;

whereby the overall height of said attachment head on the first side is at least 68 millimeters and the top surface and the bottom surface of the attachment head taper continuously from the bearing surface to the means for welding on the pipe;

characterized in that the ratio of the height of the first sub-surface to the height of the second sub-surface is 1:1.3 to 1:1.6.

11. A scaffolding system comprising a connecting device, the connecting device for use with vertical post elements each having a perforated disk and having pipe, and for connecting horizontal or diagonal scaffolding elements thereto, each perforated disk having a thickness, said connecting device comprising:

an attachment head and a clamping device, said attachment head having opposed first and second sides and having a top surface and a bottom surface, said attachment head having a bearing surface on the first side by which means it is supported on said pipe, said attachment head having on the first side a horizontal slit corresponding at least to the thickness of the perforated disk, said slit dividing the bearing surface into first and second sub-surfaces, means for welding on a pipe provided on the second side;

whereby the overall height of said attachment head on the first side is at least 68 millimeters and the top surface and the bottom surface of the attachment head taper continuously from the bearing surface to the means for welding on the pipe;

characterized in that the ratio of the height of the first sub-surface to the height of the second sub-surface is 1:1.3 to 1:1.6.

* * * * *